United States Patent
Kwon et al.

(10) Patent No.: US 11,335,970 B2
(45) Date of Patent: May 17, 2022

(54) BATTERY PACK PROVIDED WITH DEGASSING FLOW CHANNEL

(71) Applicant: LG CHEM, LTD., Seoul (KR)

(72) Inventors: Hee-Yong Kwon, Daejeon (KR); Jun-Yeob Seong, Daejeon (KR); Yong-Jin Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 89 days.

(21) Appl. No.: 16/755,290

(22) PCT Filed: Mar. 20, 2019

(86) PCT No.: PCT/KR2019/003265
§ 371 (c)(1),
(2) Date: Apr. 10, 2020

(87) PCT Pub. No.: WO2019/203460
PCT Pub. Date: Oct. 24, 2019

(65) Prior Publication Data
US 2021/0226295 A1    Jul. 22, 2021

(30) Foreign Application Priority Data

Apr. 20, 2018  (KR) .......................... 10-2018-0046302

(51) Int. Cl.
*H01M 50/35*    (2021.01)
*H01M 50/502*   (2021.01)
(Continued)

(52) U.S. Cl.
CPC ......... *H01M 50/35* (2021.01); *H01M 10/425* (2013.01); *H01M 50/105* (2021.01);
(Continued)

(58) Field of Classification Search
None
See application file for complete search history.

(56) References Cited

U.S. PATENT DOCUMENTS

| | | | |
|---|---|---|---|
| 2009/0286138 | A1 | 11/2009 | Shimamori |
| 2012/0094155 | A1 | 4/2012 | Lim |
| 2012/0288745 | A1 | 11/2012 | Payne |
| 2013/0040174 | A1 | 2/2013 | Takasaki et al. |

(Continued)

FOREIGN PATENT DOCUMENTS

| | | |
|---|---|---|
| CN | 107210404 A | 9/2017 |
| JP | 2005-166570 A | 6/2005 |

(Continued)

OTHER PUBLICATIONS

Extended European Search Report for European Application No. 19788748.2, dated Jan. 29, 2021.

(Continued)

*Primary Examiner* — Carmen V Lyles-Irving
(74) *Attorney, Agent, or Firm* — Birch, Stewart, Kolasch & Birch, LLP (57) ABSTRACT

A battery pack includes a pack case configured to accommodate a cell module assembly in an inner space thereof and having an opening formed at one side, and a pack cover having a degassing port communicating with the inner space and configured to cover the opening of the pack case. The cell module assembly includes a cell fixing frame having an upper plate and a lower plate respectively disposed at an upper portion and a lower portion of the cell stack and in surface contact with an upper wall and a lower wall of the pack case. At least one of the upper plate and the lower plate includes at least one gas moving route formed by concavely depressing one surface in contact with the upper wall or the lower wall of the pack case along a path toward the degassing port, and at least one hole.

10 Claims, 5 Drawing Sheets

(51) Int. Cl.
  *H01M 50/105* (2021.01)
  *H01M 50/204* (2021.01)
  *H01M 10/42* (2006.01)

(52) U.S. Cl.
  CPC ....... *H01M 50/204* (2021.01); *H01M 50/502* (2021.01); *H01M 2010/4271* (2013.01); *H01M 2220/20* (2013.01)

(56) References Cited

U.S. PATENT DOCUMENTS

| | | |
|---|---|---|
| 2015/0171391 A1 | 6/2015 | Ahn |
| 2016/0141573 A1 | 5/2016 | Aoki et al. |
| 2017/0033419 A1 | 2/2017 | Eom et al. |
| 2017/0084884 A1 | 3/2017 | Tononishi |
| 2017/0194674 A1 | 7/2017 | Lee et al. |
| 2018/0006281 A1 | 1/2018 | Eom et al. |
| 2018/0076493 A1 | 3/2018 | Park et al. |
| 2018/0254444 A1 | 9/2018 | Yoon et al. |
| 2020/0185797 A1 | 6/2020 | Park |

FOREIGN PATENT DOCUMENTS

| | | |
|---|---|---|
| JP | 2012-79510 A | 4/2012 |
| JP | 2012-89499 A | 5/2012 |
| JP | 2012-243760 A | 12/2012 |
| JP | 2013-114952 A | 6/2013 |
| JP | 2014-160571 A | 9/2014 |
| JP | 2017-59505 A | 3/2017 |
| JP | 2018-502414 A | 1/2018 |
| KR | 10-2010-0081942 A | 7/2010 |
| KR | 10-2013-0126044 A | 11/2013 |
| KR | 10-2014-0002115 A | 1/2014 |
| KR | 10-2015-0023113 A | 3/2015 |
| KR | 10-2015-0059515 A | 6/2015 |
| KR | 10-2015-0069732 A | 6/2015 |
| KR | 10-2016-0082073 A | 7/2016 |
| KR | 10-2016-0105354 A | 9/2016 |
| KR | 10-2016-0105359 A | 9/2016 |
| KR | 10-2016-0112768 A | 9/2016 |
| KR | 10-2017-0047687 A | 5/2017 |
| KR | 10-2017-0090261 A | 8/2017 |
| WO | WO 2007/043510 A1 | 4/2007 |

OTHER PUBLICATIONS

International Search Report (PCT/ISA/210) issued in PCT/KR2019/003265, dated Jun. 24, 2019.

Indian Office Action dated Mar. 29, 2022 in Application No. 202017033472.

BATTERY PACK PROVIDED WITH DEGASSING FLOW CHANNEL

TECHNICAL FIELD

The present disclosure relates to a battery pack, and more particularly, to a battery pack having a gas channel capable of smoothly discharging gas generated at battery cells to the outside.

The present application claims priority to Korean Patent Application No. 10-2018-0046302 filed on Apr. 20, 2018 in the Republic of Korea, the disclosures of which are incorporated herein by reference.

BACKGROUND ART

A battery pack applied to an electric vehicle or the like includes a plurality of secondary battery cells connected in series and/or in parallel to obtain high output. Each of the secondary battery cells includes positive and negative electrode current collectors, a separator, an active material, and an electrolyte and may be repetitively charged and discharged by electrochemical reactions among the components.

The secondary battery cell may be classified into a can-type secondary battery in which an electrode assembly is embedded in a metal can and a pouch-type secondary battery in which an electrode assembly is embedded in an aluminum laminate sheet, depending on its shape. The pouch-type secondary battery is lightweight compared to the can-type secondary battery and has a low possibility of electrolyte leakage and flexibility in shape, so that a secondary battery of the same capacity may be realized with smaller volume and mass. For this reason, the pouch-type secondary battery is preferred as a secondary battery cell of a battery pack for the electric vehicle.

The pouch-type secondary battery is charged or discharged by an electrochemical reaction. However, if the heat accompanied by the charging and discharging is not effectively removed, the internal temperature of the secondary battery may rapidly rise. The rapid rise in temperature causes the decomposition reaction of the electrolyte, thereby creating a gas inside the secondary battery.

Meanwhile, in case of an electric vehicle, if the gas leaking from the secondary battery is filled in the inner space of the battery pack, the internal pressure of the battery pack is increased. The sudden increase in the internal pressure of the battery pack may deform the pack case and interfere with the normal operation of other secondary batteries, so the gas must be discharged quickly out of the battery pack. To this end, the conventional battery pack has a gas outlet for discharging the gas in the battery pack to the outside, as disclosed in Korean Unexamined Patent Publication No. 10-2016-0112768.

However, recently, the industry that manufactures battery packs for electric vehicles produces a battery pack with maximized energy density by slimming a pack case and accommodating secondary battery cells in the pack case very intensively.

The compact battery pack has a closed or narrow gas flow path to the gas outlet when the gas is generated at a site distant from the gas outlet of the pack case. In this case, the gas is not quickly discharged to the outside, so the internal pressure of the battery pack increases, thereby deteriorating the stability of the battery pack. Thus, it is necessary to provide a method capable of maximizing the energy density while allowing quick gas discharge.

DISCLOSURE

Technical Problem

The present disclosure is designed to solve the problems of the related art, and therefore the present disclosure is directed to providing a battery pack, which may have a high energy density since secondary battery cells are intensively accommodated and also may secure safety since a channel for quickly discharging gas along an intended path is applied.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, which includes cell module assembly, a pack case having an upper wall and a lower wall and configured to accommodate the cell module assembly in an inner space thereof and having an opening formed at one side thereof, and a pack cover having a degassing port communicating with the inner space and configured to cover the opening of the pack case, wherein the cell module assembly includes: a cell stack configured by secondary battery cells; and a cell fixing frame having an upper plate disposed at an upper portion of the cell stack and disposed in surface contact with the upper wall of the pack case and a lower plate disposed at a lower portion of the cell stack and disposed in surface contact with the lower wall of the pack case, wherein at least one of the upper plate and the lower plate includes: at least one gas moving route formed by concavely depressing at least one region of one surface disposed in surface contact with the upper wall or the lower wall of the pack case along a predesignated path toward the degassing port; and at least one hole formed vertically through the gas moving route, wherein the at least one hole communicating with a gas pocket that is a space in which gas leaking from at least one side of the cell stack is collected.

The secondary battery cell may be a pouch-type secondary battery cell, and the gas pocket may be provided in a region where terrace portions of the secondary battery cells disposed farthest from the degassing port are arranged in a layered form.

The at least one gas moving route may have a linear path from the at least one hole toward the pack cover.

The battery pack may further comprise an adhesive resin interposed in a space between both side surfaces of the cell stack and both sidewalls of the pack case to fix the cell stack with respect to the pack case.

The cell fixing frame may further include a cell guide vertically disposed at both side surfaces of the cell stack and having an uneven structure formed at a plate surface thereof so that side wings of the secondary battery cells are disposed thereto, and both sidewalls of the pack case and the cell guide may have at least one resin hole at every predesignated location so that the adhesive resin passes in or out through the resin hole.

The cell fixing frame may further include a vertical plate vertically coupled to rear ends of the upper plate and the lower plate.

The battery pack may further comprise a plurality of bus bars disposed to at least one side of the cell stack where electrode leads of the secondary battery cells are positioned and electrically connected to the electrode leads; and a bus bar housing having a rectangular frame shape in which the plurality of bus bars are installed and detachably coupled to an end of the cell fixing frame.

The pack cover may have an electric component mounting portion formed at a center of an inner surface thereof to protrude outwards corresponding to the shape of electric components to accommodate the electric components at the inner surface thereof.

The battery pack may further comprise a BMS assembly provided between the pack cover and the cell module assembly to be detachably coupled to the pack cover and the cell module assembly.

In another aspect of the present disclosure, there is also provided au electric vehicle, comprising the battery pack described above.

Advantageous Effects

According to an embodiment of the present disclosure, it is possible to increase the energy density by intensively accommodating secondary battery cells in the inner space of the pack case, and also it is possible to secure safety by quickly discharging the gas generated from the secondary battery cells to the outside of the batter pack along an intended path.

In addition, according to another embodiment of the present disclosure, it is possible to minimize the volume of the battery pack by fixing the secondary battery cells integrally and securing a gas moving route by using a cell fixing frame.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
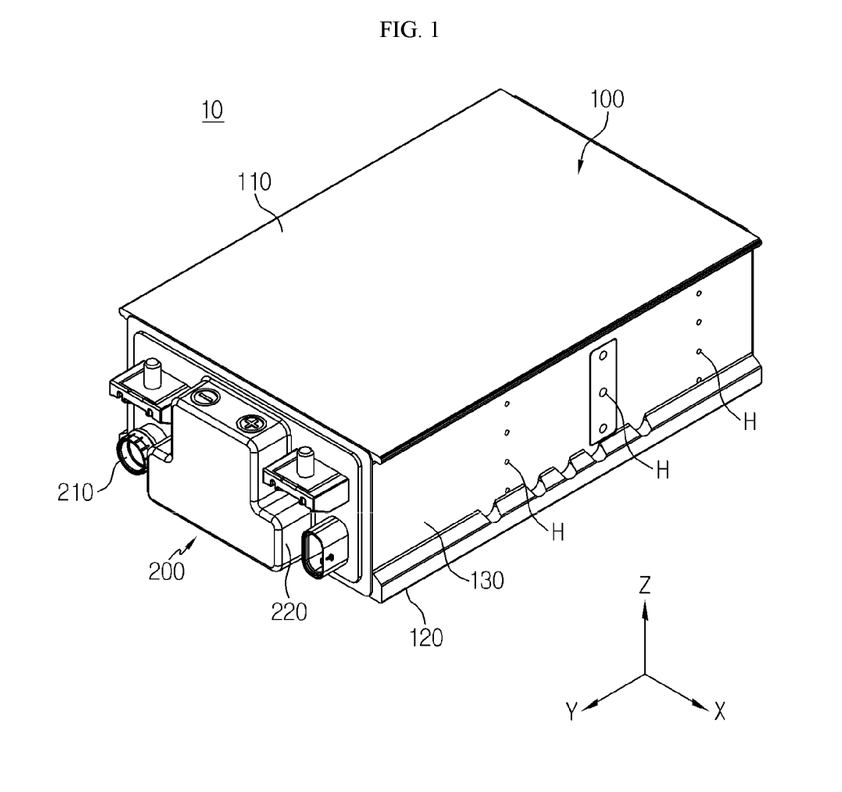
FIG. 1 is a perspective view showing a battery pack according to an embodiment of the present disclosure.
Figure 2:
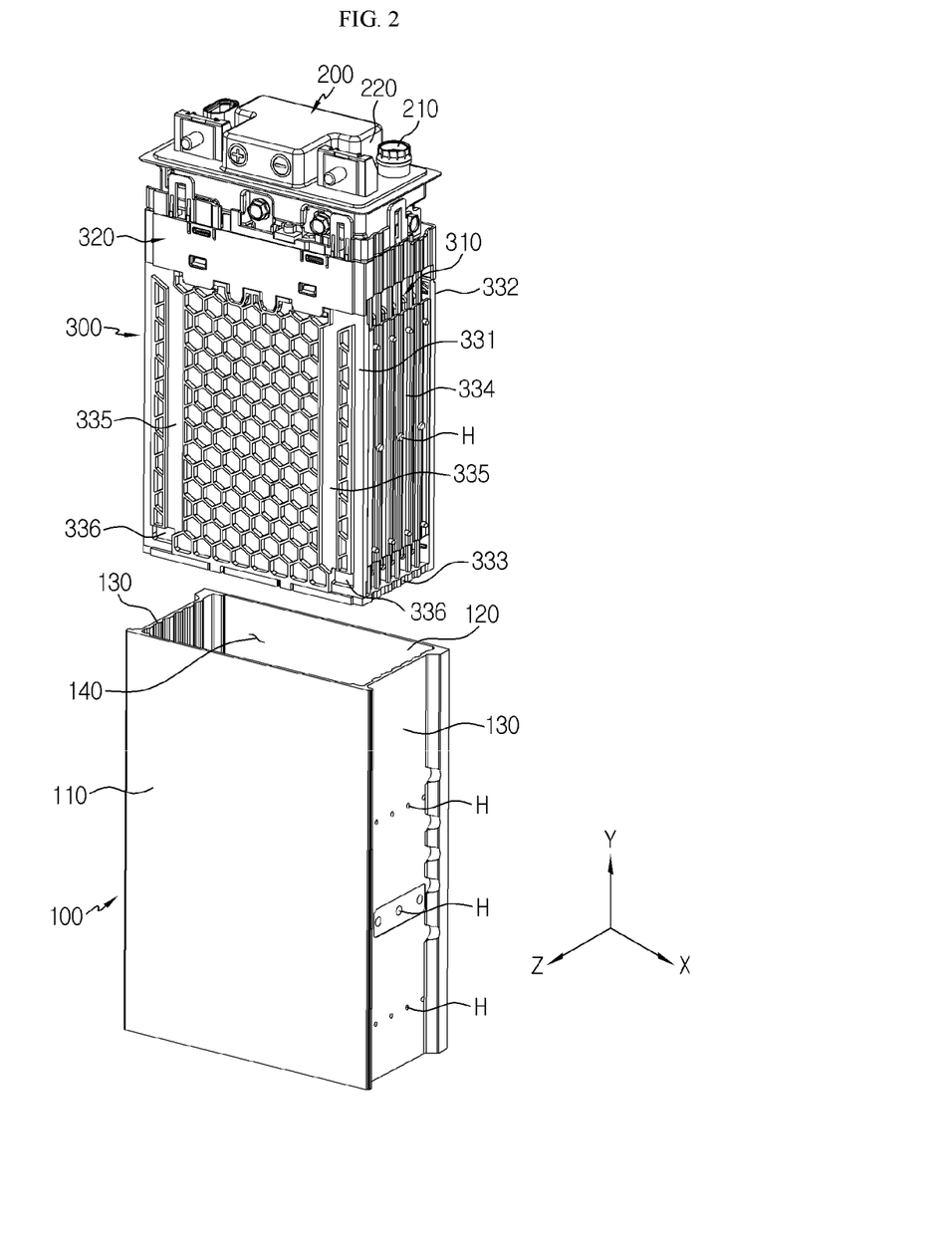
FIG. 2 is a perspective view showing that a pack case is separated from the battery pack of FIG. 1.

FIG. 1 is a perspective view showing a battery pack according to an embodiment of the present disclosure, and FIG. 2 is a perspective view showing that a pack case is separated from the battery pack of FIG. 1.

Referring to FIGS. 1 and 2, the battery pack 10 according to an embodiment of the present disclosure includes a pack case 100, a pack cover 200, and a cell module assembly 300.

The pack case 100 accommodates the cell module assembly 300 in an inner space thereof and protects the cell module assembly 300. The pack case 100 provides a mechanical support force to the cell module assembly 300 and protects the cell module assembly 300 from an external impact or the like. The pack case 100 may be preferably made of a metal such as steel or a metal alloy in order to secure sufficient rigidity.

The pack case 100 according to this embodiment may have a substantially rectangular parallelepiped box shape with an opening 140 formed at one side thereof as shown in FIG. 2. The cell module assembly 300 may be inserted into the inner space of the pack case 100 through the opening 140. Also, the pack case 100 has at least one resin hole H formed at every predesignated location of both sidewalls 130 thereof. If the cell module assembly 300 is inserted into the inner space of the pack case 100, an adhesive resin is injected into the pack case 100 through the resin hole H to fix the cell module assembly 300 to both sidewalls 130 of the pack case 100.

That is, though not shown for convenience of illustration, the adhesive resin may be filled in a space between both side surfaces of the cell stack 310 and both sidewalls 130 of the pack case 100. The adhesive resin not only fixes the cell module assembly 300 but also may be used as a heat exchange medium between the secondary battery cells 311 and the pack case 100.

The pack case 100 may include a mono frame and a rear cover. The mono frame may be a structure having an upper wall 110 and a lower wall 120 with the same thickness and the both sidewalls 130 with the same thickness, which are fabricated in a hollow rectangular tube shape. One of the openings of the mono frame may be shielded by a plate-shaped rear cover. Here, the pack case 100 may be made so that the mono frame and the rear cover are integrally formed.

The pack cover 200 may have a degassing port 210 and may be mounted to the pack case 100 to cover the opening of the pack case 100. The degassing port 210 is provided to communicate with the inner space of the pack case 100 and serves to discharge gas generated inside the battery pack 10 to the outside.

In addition, the pack cover 200 may include a positive electrode terminal and a negative electrode terminal provided at an outer side thereof, and an electric component mounting portion 220 provided therein to give a space where electric components such as a BDU (Battery Disconnect Unit) 230 for shutting off the flow of high current may be assembled.

Figure 3:
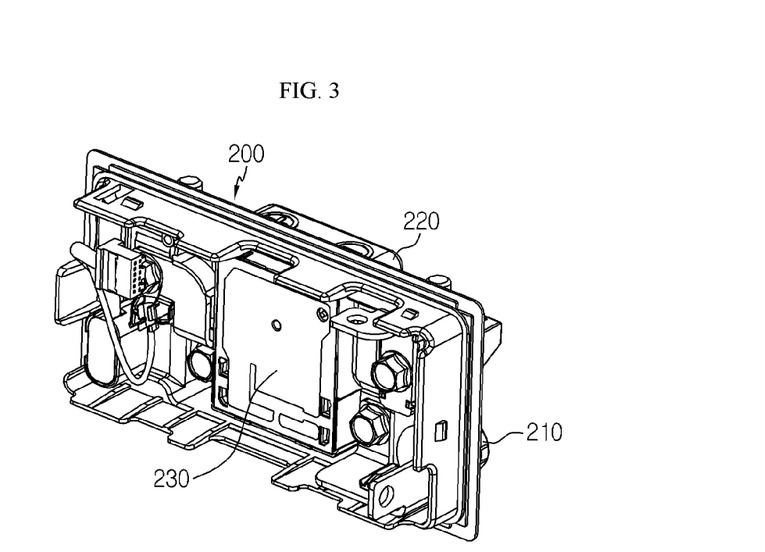
FIG. 3 is a perspective view showing an inner side of a pack cover of FIG. 1.
Figure 4:
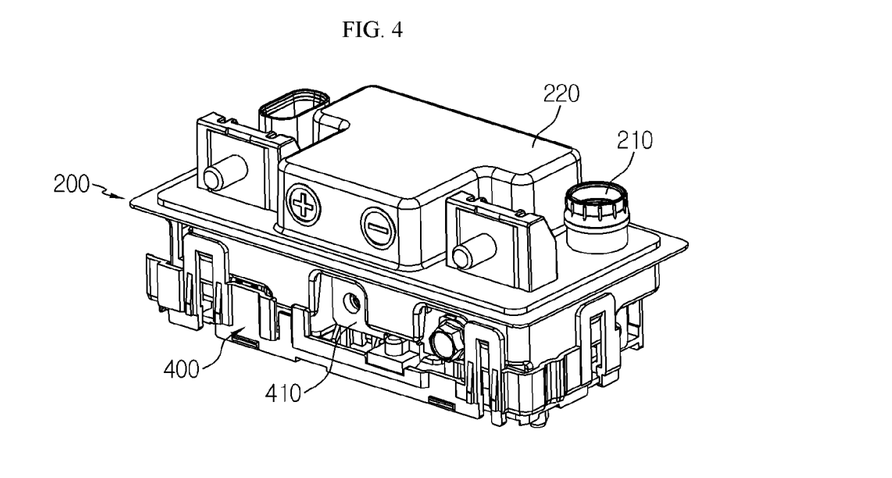
FIG. 4 is a perspective view showing that a BMS assembly is coupled to the pack cover of FIG. 3.

For example, as shown in FIGS. 3 and 4, the electric component mounting portion 220 may be formed at an inner surface of the pack cover 200 by convexly protruding a center of the pack cover 200 outwardly. The electric component mounting portion 220 may be shaped corresponding to the electric components that are to be mounted at the corresponding location.

In addition as shown in FIG. 4, a BMS assembly 400 may be further coupled to the pack cover 200. The BMS assembly 400 may include a BMS circuit board on which a BMS a current sensor (shunt resistor) 410, and the like are mounted, and a BMS housing for supporting the BMS circuit board. The BMS housing may be detachably assembled along an inner periphery of the pack cover 200 in a snap-fitting manner and thus be integrally fixed to the pack cover 200.

The BMS assembly 400 may be assembled to be electrically and structurally connected to a front end of the cell module assembly 300 (toward an electrode lead 311a) in a state of being fixed to the pack cover 200. The positive and negative electrode terminals of the pack cover 200, the BMS circuit board of the BMS assembly and the secondary battery cells 311 of the cell module assembly 300 may be electrically connected to each other by components such as a bus bar, a cable, a connector, or the like. This is obvious to those skilled in the art and thus will not be described in detail.

Figure 5:
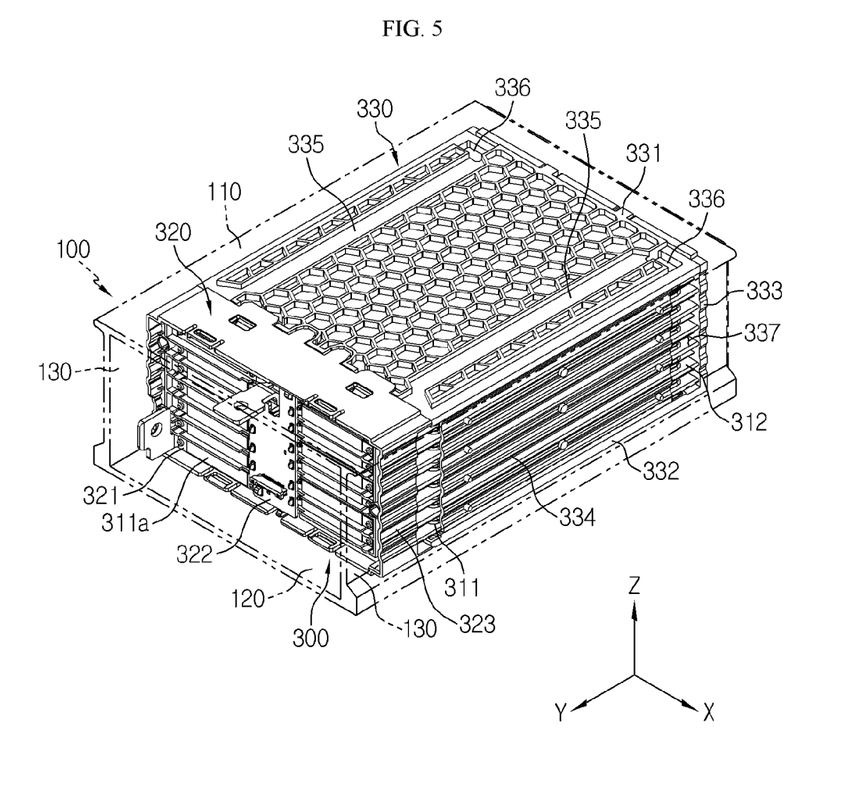
FIG. 5 is a perspective view schematically showing that a cell module assembly is accommodated in an inner space of the pack case according to an embodiment of the present disclosure.

Meanwhile, the cell module assembly 300 includes a cell stack 310, a bus bar assembly 320 and a cell fixing frame 330. As shown in FIG. 5, the cell module assembly 300 may be tightly inserted into the inner space of the pack case 100. That is, the width and height of the cell module assembly 300 are substantially identical to the width and height of the inner space of the pack case 100.

The cell stack 310, which is a main component of the cell module assembly 300, may be an aggregate of the secondary battery cells 311 stacked on one another. Here, the secondary battery cell 311 is a pouch-type secondary battery. Each pouch-type secondary battery includes an electrode assembly, a pouch exterior for accommodating the electrode assembly, and an electrode lead 311a connected to the electrode assembly and partially protruding out of the pouch exterior.

The pouch exterior includes an upper pouch and a lower pouch. Rims of the upper pouch and the lower pouch are bonded to each other so that the electrode assembly is accommodated in the inner space. The rims of the pouch exteriors sealed with each other are defined as terraces 312. The shape of the pouch-type secondary battery may be variously determined depending on the shape of the electrode assembly, but in general, the pouch-type secondary battery may be manufactured in a substantially rectangular shape. The terrace 312 of the pouch-type secondary battery may be classified into a short-side terrace 312 and a long-side terrace 312 depending on the location thereof. Particularly, the long-side terrace 312 corresponds to a side surface of the pouch-type secondary battery and may also be referred to as a side wing.

The bus bar assembly 320 includes a plurality of bus bars 321, a printed circuit board 322 connected to each bus bar 321, and a bus bar housing 323 supporting the bus bars 321 and the printed circuit board 322.

The plurality of bus bars 321 have a metal rod shape, and the electrode leads 311a of the secondary battery cells 311 may be attached to the surface of the plurality of bus bars 321. That is, the electrode leads 311a of the secondary battery cells 311 may be electrically connected to each other by, for example, welding their ends to the corresponding bus bars 321.

One ends of the plurality of bus bars 321 may be connected to the printed circuit board 322. The printed circuit board 322 is used to sense a voltage characteristic of the secondary battery cells 311 through the respective bus bars 321 and transmit the voltage information to a BMS connected thereto using a cable connector.

The bus bar housing 323 serves as a frame that provides a place where the plurality of bus bars 321 and the printed circuit board 322 may be mounted.

The bus bar housing 323 of this embodiment has a rectangular frame shape in which the plurality of bus bars 321 and the printed circuit board 322 are installed, and the peripheral portion of the bus bar housing 323 is detachably inserted into a front end of the cell fixing frame 330 to be coupled thereto. A side surface of the bus bar housing 323 have hooking holes as a detachable coupling means. Here, unlike this embodiment, it is also possible that a hooking hole is provided in the cell fixing frame 330 and a hook is provided at the side surface of the bus bar housing 323.

The cell fixing frame 330 may include an upper plate 331 and a lower plate 332 respectively disposed at an upper portion and a lower portion of the cell stack 310 with respect to the stacking direction of the secondary battery cells 311 to support an upper portion and a lower portion of the cell stack 310, and a vertical plate 333 for vertically connecting rear ends of the upper plate 331 and the lower plate 332. Here, the rear ends of the upper plate 331 and the lower plate 332 means ends of the upper plate 331 and the lower plate 332 located opposite to the opening 140 of the pack case 100.

As shown in FIG. 5, when the cell module assembly 300 is inserted into the inner space of the pack case 100, the upper plate 331 and the lower plate 332 of the cell fixing frame 330 are in close contact with the upper wall 110 and the lower wall 120 of the pack case 100, respectively. That is, the height including the upper plate 331, the lower plate 332 and the cell stack 310 may be predetermined as a dimension corresponding to the inner space of the pack case 100.

In addition, the cell fixing frame 330 may further include a cell guide 334 disposed vertically at both side surfaces of the cell stack 310 and having a plate surface formed in an uneven structure.

The secondary battery cells 311 may be slidably inserted one by one into a space enclosed by the upper plate 331, the lower plate 332, the vertical plate 333 and the cell guide 334 in a state of being vertically fixed by the cell guide 334. In other words, the cell stack 310 may be formed so that the secondary battery cells 311 are inserted into the cell fixing frame 330 one by one by sliding. In this case, since both side portions of the secondary battery cells 311 are guided by the cell guide 334, the secondary battery cells 311 may be stacked properly at a predetermined location.

The cell guide 334 may further have at least one resin hole H formed at every predesignated location so that an adhesive resin passes in and out therethrough. As described above, the adhesive resin may be injected into the pack case 100 through the resin holes H at both sidewalls 130 of the pack case 100. At this time, a part of the adhesive resin injected into the pack case 100 may permeate between the cell guide 334 and the sidewall 130 of the pack case 100, and the remaining part of the adhesive resin may permeate into the space between the secondary battery cells 311 and the cell guide 334 through the resin hole H of the cell guide 334. Thus, the secondary battery cells 311, the cell guide 334 and the sidewall 130 of the pack case 100 may be fixedly coupled to each other by an adhesive resin (not shown).

The cell guide 334 may be made of a material having excellent thermal conductivity such as aluminum or an aluminum alloy. In this case, the heat of the secondary battery cells 311 accompanied with the charging and discharging process may be rapidly discharged to the outside through the cell guide 334 and the adhesive resin.

According to this embodiment, since the cell stack 310 is compressed by the upper plate 331 and the lower plate 332 of the cell fixing frame 330 and both side surfaces may be fixed by the adhesive resin, the reliability of the electrical connection between the secondary battery cells 311 may be secured even when vibration or external impact is applied thereto. In addition, the number of components for fixing the cell stack 310 may be reduced, thereby improving energy density and ensuring easy assembling.

Meanwhile, if gas is generated in the secondary battery cell 311 due to the electrolytic decomposition reaction during charging and discharging to make the swelling phenomenon severe, gas may be leaked out of the secondary battery cell 311 as the sealing at the portion of the terrace 312 is weakened due to the increase of the internal pressure.

In this embodiment, since the space between both side surfaces of the secondary battery cells 311 and both sidewalls 130 of the pack case 100 is filled with an adhesive resin, the gas may not easily leak at both side surfaces of the secondary battery cell 311. However, the gas may leak through the short-side terraces 312 of the secondary battery cells 311, which are not filled with an adhesive resin.

In order to quickly discharge the gas to the outside along an intended path in the battery pack 10, the battery pack 10 according to the present disclosure includes a gas moving route 335 and a hole 336 provided in the upper plate 331 and the lower plate 332 of the cell fixing frame 330.

Figure 6:
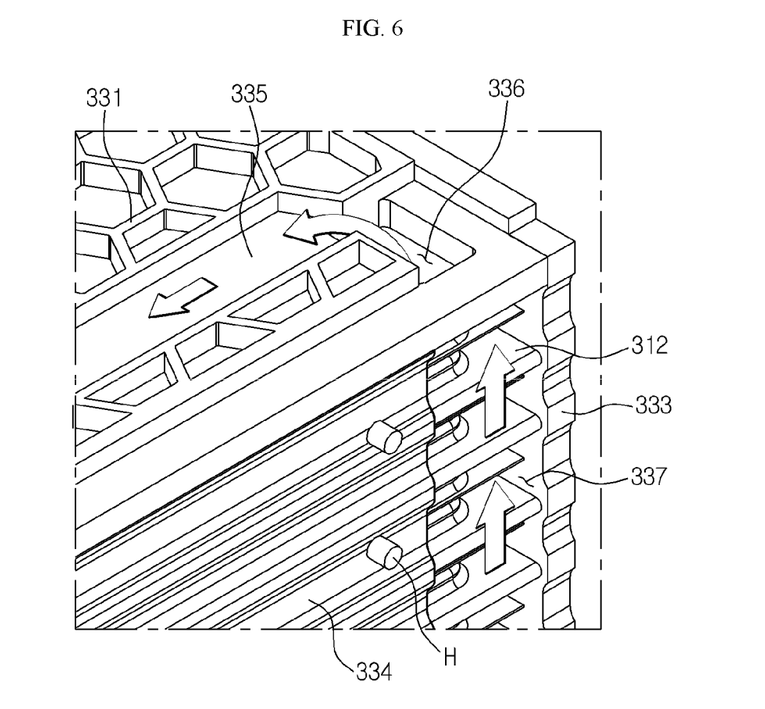
FIG. 6 is an enlarged view showing a region of a gas pocket of FIG. 5.
Figure 7:
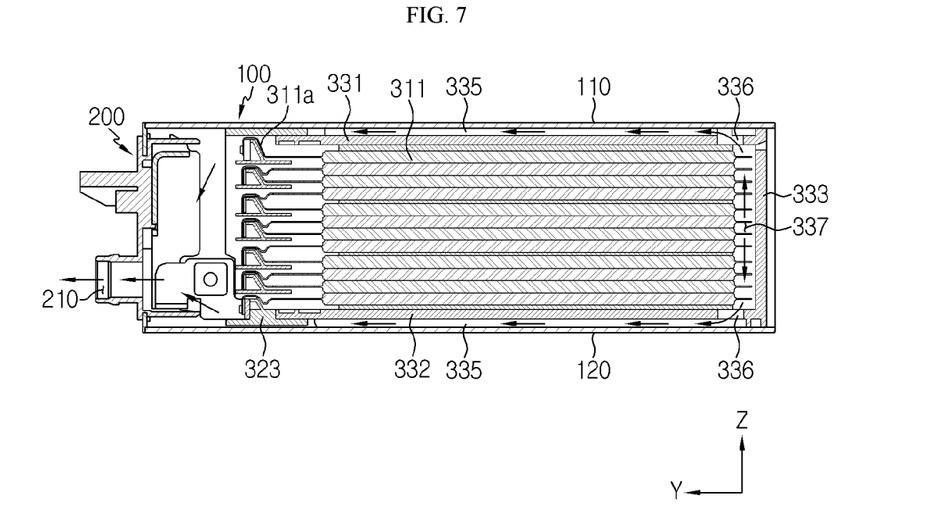
FIG. 7 is a schematic cross-sectioned view of the battery pack for illustrating a gas discharge path according to an embodiment of the present disclosure.

For example, as shown in FIGS. 5 to 7, at least one of the upper plate 331 and the lower plate 332 of the cell fixing frame 330 has at least one gas moving route 335 formed by concavely depressing at least one region of one surface in surface contact with the upper wall 110 or the lower wall 120 of the corresponding pack case 100 along a predesignated path toward the degassing port 210, and at least one hole 336 formed vertically through a plate surface of the gas moving route 335.

If the cell module assembly 300 is inserted into the inner space of the pack case 100 as described above, for example, the upper plate 331 of the cell fixing frame 330 is brought into close surface contact with the upper wall 110 of the pack case 100, so that a portion of the gas moving route 335 covered by the upper wall 110 of the pack case 100 may serve as a passage through which gas flow may be guided.

The gas generated in the cell stack 310 may be guided to the gas moving route 335 through the at least one hole 336 formed in the upper plate 331 and the lower plate 332 of the cell fixing frame to flow toward the degassing port 210.

In case of a pouch-type secondary battery cell, gas is generally leaked at a rim portion of the pouch-type secondary battery cell, which is sealed in a rectangular plate shape. Considering this, the at least one hole 336 of this embodiment is provided in corner regions of the upper plate 331 and the lower plate 332 so as to be located closest to the position where the gas may leak from the cell stack 310.

Here, the corner regions of the upper plate 331 and the lower plate 332 may be specified as regions corresponding to the edge regions of the cell stack 310. In this case, the at least one hole 336 is located right above or right below the short-side terraces 312 of the secondary battery cells 311 arranged in a layered form.

The short-side terraces 312 of the secondary battery cells 311 have a smaller thickness than the other portions of the secondary battery cells 311, and thus a lot of empty space are present above and below the short-side terraces 312. Thus, the gas generated in the secondary battery cells 311 may leak from the terraces 312 of the secondary battery cells 311 and be collected in the empty space. As described above, the empty space in which the gas leaking from at least one side of the secondary battery cells 311 of the cell stack 310 is collected is called a gas pocket 337.

In the conventional art, it is common to reduce the size of the secondary battery cell 311 by folding the terrace 312 where the electrode lead 311a is not present. However, in the present disclosure, the short-side terraces 312 of the secondary battery cells 311 are not folded but remain to provide the gas pocket 337 among the upper plate 331, the lower plate 332 and the vertical plate 333 of the fixing frame, and the gas pocket 337 is used as a space in which gas may flow vertically.

As shown in FIGS. 5 and 6, the gas pocket 337 according to this embodiment may be provided at a place where the terraces 312 of the secondary battery cells located farthest from the degassing port 210 are arranged in a layered form.

The at least one hole 336 according to this embodiment may be provided in plural, and the plurality of holes 336 may be provided to the corner regions of the upper plate 331 and the lower plate 332 corresponding to the gas pocket 337 one by one. In other words, four holes 336 are provided in total, namely two holes in the upper plate 331 and two holes in the lower plate 332.

In addition, the at least one gas moving route 335 has a linear path from the corresponding holes 336 toward the pack cover 200 having the degassing port 210 along the length direction of the upper plate 331 and the lower plate 332. Here, four gas moving routes 335 are provided in total, namely one for each of both sides of the upper plate 331 and the lower plate 332.

In this way, since the gas moving route 335 is provided at both sides of the upper plate 331 and the lower plate 332 to guide the flow of gas to both sides, it is possible to avoid the interference with a structure at the pack cover 200 (for example, the bus bar assembly 320 or the BMS assembly 400).

In other words, components such as the bus bars 321 and the printed circuit board 322 that disturb the flow of gas are concentrated at the center region of the BMS assembly 400 or the bus bar assembly 320, but both sides of the BMS assembly 400 or the bus bar assembly 320 are used for engagement with each other for snap-fitting and thus have more gaps through which the gas may pass, compared with the center regions. Thus, it may be advantageous that the gas moving route 335 is provided to both sides in view of the gas flow.

In addition, referring to FIG. 5, the bus bar housing 323, which is directly snap-fitted to the upper plate 331 and the lower plate 332 of the cell fixing frame 330, may be configured such that both side portions thereof have a stepped shape lower than the central portion thereof. The stepped side portion may directly communicate with the gas moving route 335.

The gas discharge path of the battery pack 10 according to an embodiment of the present disclosure will be described in brief as follows with reference to FIGS. 6 and 7.

Both side wings (the long-side terraces 312) of the secondary battery cells 311 face the cell guide 334 and the sidewalls 130 of the pack case 100, and the space between them is filled with an adhesive resin (not shown) so that gas is not able to leak or move. Meanwhile, the two short-side terraces 312, other than both side wings of the secondary battery cells 311, are not closed, so that gas may leak out of the secondary battery cells 311.

First, the gas leaking from the short-side terraces 312 of the secondary battery cells 311 where the electrode leads 311a are located may be rapidly discharged out of the battery pack 10 through the degassing port 210 because the short-side terraces 312 are adjacent to the degassing port 210 and are not completely blocked at the front.

After that, the gas leaking from the other short-side terraces 312 of the secondary battery cells 311 (farthest from the degassing port 210) may be collected in the gas pocket 327 and diffuses to the gas moving route of the upper plate and lower plate of the cell fixing frame through the holes 336 located at the upper portion and the lower portion of the gas pocket 327. In addition, as indicated by arrows in FIG. 7 to show a gas flow line, the flow of gas may be guided toward the pack cover 200 and discharged out of the battery pack 10 through the degassing port 210.

According to this configuration of the present disclosure, because the secondary battery cells 311 are intensively stored in the inner space of the pack case 100, the energy density of the battery pack 10 is very high. Also, even if gas is generated in the secondary battery cells 311, the gas may quickly discharged out of the battery pack 10 along an intended path, thereby preventing the risk of explosion caused by an increased internal pressure of the battery pack 10.

For reference, the battery pack 10 according to this embodiment is a battery pack 10 constructed using unidirectional pouch-type secondary battery cells 311, but the present disclosure is not necessarily limited to the battery pack 10 employing the unidirectional pouch-type secondary battery cells 311. In other words, even in a battery pack employing bidirectional pouch-type secondary battery cells 311 where a positive electrode lead and a negative electrode lead are located at opposite sides, gas discharged from the terraces 312 of the secondary battery cells 311 located farthest from the degassing port 210 may be guided to the degassing port 210 due to the gas moving route 335 and the hole 336 of the upper plate 331 and the lower plate 332 of the cell fixing frame 330, similar to this embodiment.

In addition, the battery pack according to this embodiment uses the pouch-type secondary battery cells, but the present disclosure is not necessarily limited thereto. As an alternative to the pouch-type secondary battery cells, rectangular or cylindrical secondary battery cells may also be applied. For example, the rectangular or cylindrical secondary battery cells may be stacked in one or more stages. The upper plate 331 and the lower plate 332 of the cell fixing frame may be respectively disposed at the upper portion and the lower portion of the cell stack to support the upper portion and the lower portion of the cell stack including the rectangular or cylindrical secondary battery cells, and be inserted into the pack case 100 to be in close contact with the upper wall 110 and the lower wall 120 of the pack case 100. In this case, even if the battery pack employs the rectangular or cylindrical secondary battery cells, similar to the former embodiment, a gas discharge path may be formed in a region where the upper plate 331 and the lower plate 332 of the cell fixing frame and the upper wall 110 and the lower wall 120 of the pack case are in contact with each other.

Meanwhile, the battery pack according to the present disclosure may be applied to a vehicle such as an electric vehicle and a hybrid electric vehicle. That is, the vehicle according to the present disclosure may include at least one battery pack according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

What is claimed is:

1. A battery pack, comprising:
   a cell module assembly;
   a pack case having an upper wall and a lower wall, the upper wall spaced from the upper wall in a first direction, the pack case configured to accommodate the cell module assembly in an inner space thereof and having an opening formed at one side thereof; and
   a pack cover having a degassing port communicating with the inner space and configured to cover the opening of the pack case,
   wherein the cell module assembly includes:
   a cell stack configured by secondary battery cells; and
   a cell fixing frame having an upper plate disposed at an upper portion of the cell stack and disposed between the upper wall of the pack case and the cell stack and a lower plate disposed at a lower portion of the cell stack and disposed between the lower wall of the pack case and the cell stack, the lower plate spaced from the upper plate in the first direction,
   wherein at least one of the upper plate and the lower plate includes:
   at least one gas moving route extending in a second direction perpendicular to the first direction, the at least one gas moving route formed by concavely depressing at least one region of one surface disposed in surface contact with the upper wall or the lower wall of the pack case along a predesignated path toward the degassing port; and
   at least one hole formed in the first direction through the gas moving route, the at least one hole spaced from a perimeter of the at least one of the upper plate and the lower plate,
   wherein the at least one hole communicates with a gas pocket that is a space in which gas leaking from at least one side of the cell stack is collected,
   wherein the pack cover is spaced from the cell stack in the second direction to create a space between the at least one gas moving route and the pack cover,
   wherein the secondary battery cells are stacked in the first direction, and
   wherein the degassing port extends in the second direction.

2. The battery pack according to claim 1, wherein the secondary battery cell is a pouch-type secondary battery cell, and
   wherein the gas pocket is provided in a region where terrace portions of the secondary battery cells disposed farthest from the degassing port are arranged in a layered form.

3. The battery pack according to claim 1, wherein the at least one gas moving route has a linear path from the at least one hole toward the pack cover.

4. The battery pack according to claim 2, wherein the cell stack has a top surface, a bottom surface and side surfaces,
wherein the pack case has sidewalls extending between the upper wall and lower wall, and
further comprising:
an adhesive resin interposed in a space between the side surfaces of the cell stack and the sidewalls of the pack case to fix the cell stack with respect to the pack case.

5. The battery pack according to claim 4, wherein the cell fixing frame further includes a cell guide vertically disposed at both side surfaces of the cell stack and having an uneven structure formed at a plate surface thereof so that side wings of the secondary battery cells are disposed thereto, and
wherein both sidewalls of the pack case and the cell guide have at least one resin hole at every predesignated location so that the adhesive resin passes in or out through the resin hole.

6. The battery pack according to claim 1, wherein the cell fixing frame further includes a vertical plate vertically coupled to rear ends of the upper plate and the lower plate.

7. The battery pack according to claim 2, further comprising a bus bar assembly, which includes:
a plurality of bus bars disposed to at least one side of the cell stack where electrode leads of the secondary battery cells are positioned and electrically connected to the electrode leads; and
a bus bar housing having a rectangular frame shape in which the plurality of bus bars are installed and detachably coupled to an end of the cell fixing frame.

8. The battery pack according to claim 1, wherein the pack cover has an electric component mounting portion formed at a center of an inner surface thereof to protrude outwards corresponding to the shape of electric components to accommodate the electric components at the inner surface thereof.

9. The battery pack according to claim 1, further comprising:
a BMS assembly provided between the pack cover and the cell module assembly to be detachably coupled to the pack cover and the cell module assembly.

10. A vehicle, comprising the battery pack according to claim 1.

* * * * *